United States Patent
Smith

(10) Patent No.: US 9,384,098 B1
(45) Date of Patent: *Jul. 5, 2016

(54) PORTABLE DATA ARCHIVING DEVICE

(71) Applicant: Immediate System Resources Inc., Baltimore, MD (US)

(72) Inventor: June B. Smith, Baltimore, MD (US)

(73) Assignee: Immediate System Resources Inc., Baltimore, MD (US)

(*) Notice: Subject to any disclaimer, the term of this patent is extended or adjusted under 35 U.S.C. 154(b) by 0 days.

This patent is subject to a terminal disclaimer.

(21) Appl. No.: 14/883,809

(22) Filed: Oct. 15, 2015

Related U.S. Application Data

(63) Continuation of application No. 14/669,104, filed on Mar. 26, 2015, now Pat. No. 9,176,826.

(51) Int. Cl.
*G06F 9/445* (2006.01)
*G06F 9/44* (2006.01)
(Continued)

(52) U.S. Cl.
CPC .......... *G06F 11/1451* (2013.01); *G06F 3/0482* (2013.01); *G06F 3/0488* (2013.01); *G06F 3/04842* (2013.01); *G06F 8/61* (2013.01); *G06F 9/4411* (2013.01); *G06F 17/30073* (2013.01); *G06F 17/30126* (2013.01); *G06F 2201/80* (2013.01)

(58) Field of Classification Search
CPC .............. G06F 11/1451; G06F 3/0488; G06F 17/30126; G06F 3/0482; G06F 3/04842; G06F 17/30073; G06F 2201/80; G06F 8/61; G06F 9/4411

USPC .................................................. 717/168–178
See application file for complete search history.

(56) References Cited

U.S. PATENT DOCUMENTS

| | | | | |
|---|---|---|---|---|
| 2009/0048853 | A1* | 2/2009 | Hall | G06Q 10/20 705/305 |
| 2012/0278796 | A1* | 11/2012 | Sandlin | G06F 9/4411 717/174 |
| 2013/0205292 | A1* | 8/2013 | Levijarvi | G06F 11/1415 717/177 |

OTHER PUBLICATIONS

"Directory (computing)," Wikipedia, the free encyclopedia, last modified Feb. 16, 2015, http://en.wikipedia.org/wiki/Directory_(computing), 3 pages (Continued)

*Primary Examiner* — Ryan Coyer
(74) *Attorney, Agent, or Firm* — Fish & Richardson P.C.

(57) ABSTRACT

Techniques for archiving data, including methods, systems, and apparatus, including machine-readable media storing executable instructions. In some implementations, an apparatus includes a touch screen, one or more processors, a battery, non-volatile data storage device, and machine-readable media including executable instructions for performing data archiving operations. In some implementations, communication with a source device is established. A device driver may be transmitted from the apparatus to the source device and installed on the source device. The device driver may be configured to generate an identifier for the source device. A particular logical data storage area may be assigned based on the received identifier. A user interface may be displayed on the touch screen to receive user input requesting data from the source device. The data from the source device may be received by the apparatus and stored in the particular storage area assigned to the source device.

20 Claims, 7 Drawing Sheets

(51) Int. Cl.
| | |
|---|---|
| *G06F 11/14* | (2006.01) |
| *G06F 3/0488* | (2013.01) |
| *G06F 17/30* | (2006.01) |
| *G06F 3/0484* | (2013.01) |
| *G06F 3/0482* | (2013.01) |

(56) References Cited

OTHER PUBLICATIONS

"Disk partitioning," Wikipedia, the free encyclopedia, last modified Apr. 3, 2015, http://en.wikipedia.org/wiki/Disk_partitioning, 8 pages.
"External storage," Wikipedia, the free encyclopedia, last modified Mar. 2015, http://en.wikipedia.org/wiki/External_storage, 4 pages.
"iPod nano User Guide," Apple Inc., ©2011, 66 pages.
"Nexto ND-2725 video backup: has Sean Penn met his match?," Dec. 10, 2008, http://www.engadget.com/2008/12/10/nexto-nd-2725-video-backup-has-sean-penn-met-his-match/, 2 pages.
Galbraith, "Find the right backup drive for your storage needs," PCWorld, Dec. 6 2013, http://www.pcworld.com/article/2069900/find-the-right-backup-drive-for-your-storage-needs.html, 5 pages.
iPod Classic User Guide, 2008, https://manuals.info.apple.com/MANUALS/0/MA630/en_US/iPod_classic_120GB_en.pdf, 76 pages.
iPod Touch User Guide, Jun. 2013, https://manuals.info.apple.com/MANUALS/1000/MA1657/en_US/ipod_touch_ios6_user_guide.pdf, 138 pages.
My Cloud™ Personal Cloud Storage Product Overview, Sep. 2013, http://www.wdc.com/wdproducts/library/AAG/ENG/4178-705970.pdf, 2 pages.
WD My Cloud Website, © 2001-2015 (accessed Apr. 6, 2015) http://www.wdc.com/en/products/products.aspx?id=1140, 11 pages.
WD My Cloud™ Personal Cloud Storage User Manual, Nov. 2013, http://www.wdc.com/wdproducts/library/UM/ENG/4779-705103.pdf, 126 pages.
Notice of Allowance issued in U.S. Appl. No. 14/669,014 on Jul. 1, 2015, 30 pages.

* cited by examiner

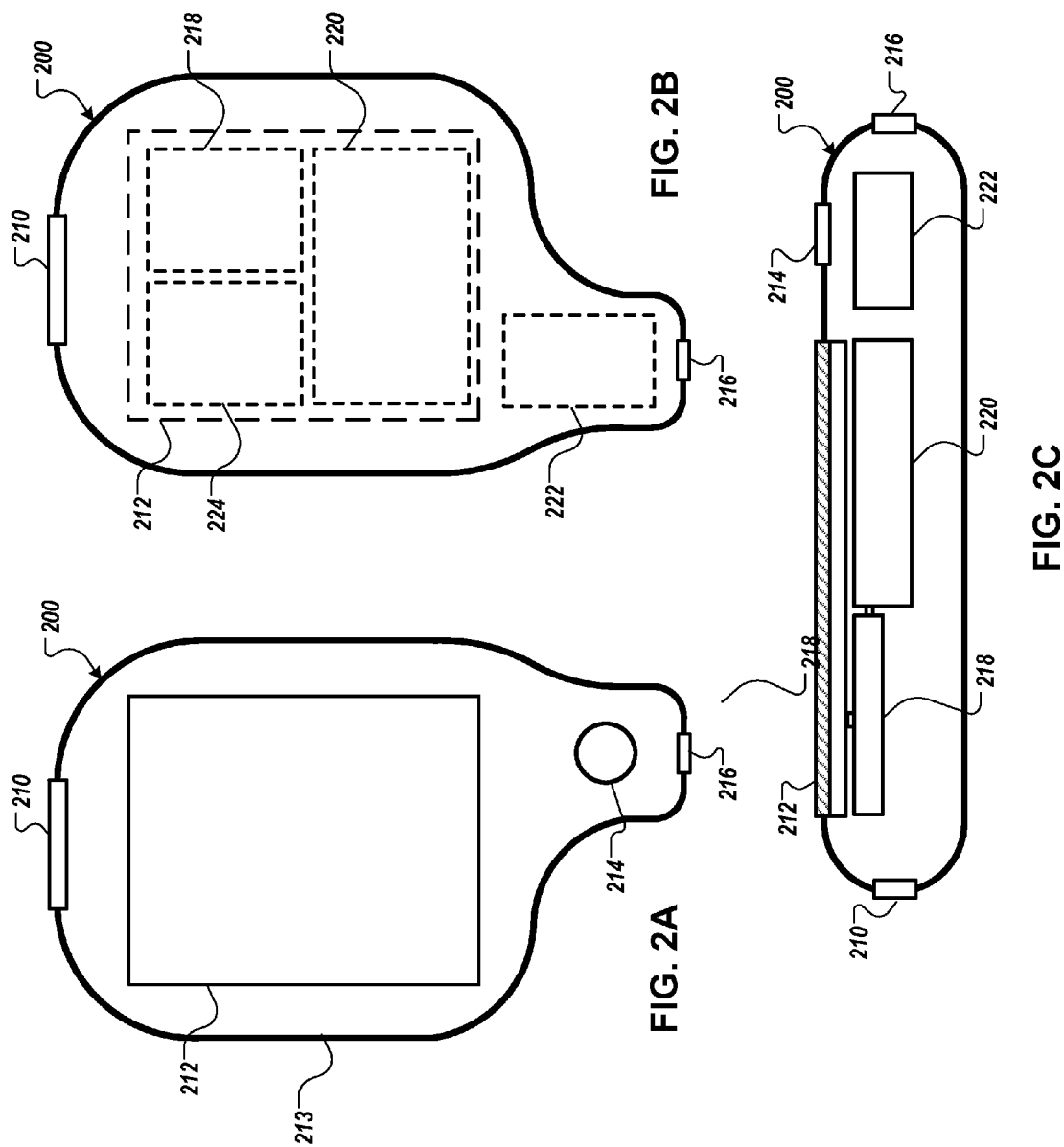

PORTABLE DATA ARCHIVING DEVICE

CROSS-REFERENCE TO RELATED APPLICATION

This application is a continuation of U.S. application Ser. No. 14/669,104, filed Mar. 26, 2015, the contents of which are incorporated herein by reference.

TECHNICAL FIELD

This specification generally describes technology for portable data archiving devices.

BACKGROUND

Computers, phones, and other devices can generate large amounts of data. This data can be stored on different types of data storage devices. Many types of data storage devices record and process information. For example, hard drives and flash drives can store data. Some external storage devices allow data to be transferred between different locations or between different devices.

SUMMARY

A portable data archiving device may be used to backup and restore data stored on multiple source devices, so that the data may be stored on a single archiving device. For example, the multiple source devices may be different types of devices or devices with different operating systems. The data archiving device may be used to store data from different devices onto separate storage areas on a single device. The data archiving device includes device drivers that enable it to perform archiving operations for many different types of source devices.

The data archiving device may cause a unique device identifier to be generated for each source device. The data archiving device may use the device identifier to identify storage directories designated for storing data from a source device associated with the identifier. The data archiving device may store the device identifiers and use them to identify source devices for subsequent archiving operations.

The data archiving device may include a touch screen that allows a user to specify instructions for archiving operations, browse files directories of the connected source device, or preview the files stored on either the data archiving device or the connected source device.

In one general aspect, an apparatus includes: a touchscreen; one or more processors; a battery; a non-volatile data storage device, the non-volatile data storage device having a plurality of different logical data storage areas; machine-readable media including executable instructions that, when executed by the one or more processors, cause the one or more processors to perform operations. The operations include: establishing communication with a source device; determining that the source device does not have a device driver for the apparatus; in response to determining that the source device does not have a device driver for the apparatus, causing the device driver to be (i) transmitted from the apparatus to the source device and (ii) installed on the source device. The device driver is configured to generate an identifier for the source device and store the identifier at the source device; receiving the identifier for the source device. The operations include assigning, based on the received identifier for the source device, a particular logical data storage area of the non-volatile data storage device for storing data from the source device, the particular logical data storage area being assigned to the source device such that the apparatus disallows other source devices from accessing data from the particular data storage device. The operations include displaying, on the touchscreen, a user interface including user selectable controls that permit a user to indicate data to be archived using the apparatus. The operations include: receiving, through the user interface displayed on the touchscreen, user input that indicates data on the source device to be archived to the non-volatile data storage device; in response to receiving the user input through the user interface displayed on the touchscreen, retrieving, from the source device, the data indicated by the user input; and storing the received data at the non-volatile data storage device in the particular logical data storage area assigned to the source device.

Implementations may include one or more of the following features. For example, the operations include causing the device driver to be transmitted and installed includes causing a device driver to be transmitted and installed, where the device driver is configured to cause the source device to generate a universally unique identifier for the source device based at least in part on characteristics of the source device or data stored at the source device.

In some implementations, the non-volatile data storage device has logical data storage areas that are respectively assigned to different source devices, where for each assigned logical data storage areas, the apparatus is configured to (i) allow the assigned source device to access the logical data storage area by and (ii) disallow access to the data storage area by devices other than the assigned source device.

In some implementations, the operations further include after the source device has been disconnected from the apparatus, re-establishing communication between the apparatus and the source device; receiving the identifier for the source device; determining, based on the identifier, that the particular logical storage area is assigned to the source device; receiving, through the touchscreen, user input requesting to restore, to the source device, data that corresponds to the source device and that is stored by the non-volatile data storage device; and transferring data from the particular logical storage area to the source device In some implementations, the operations further include establishing communication between the apparatus and a second source device that is different from the first source device; receiving an identifier for the second source device; identifying, based on the identifier, a second logical data storage area of the non-volatile data storage device that is assigned to the second source device, the second logical data storage device being different from and separate from the particular logical data storage area; receiving, through the touchscreen, user input indicating data of the second source device to be archived using the apparatus; and storing the data indicated by the user input in the second logical data storage area of the non-volatile data storage device.

In some implementations, the source device is a first source device, and the operations further include: establishing communication between the apparatus and a second source device that is different from the first source device; receiving an identifier for the second source device; and based on the identifier for the second source device, denying the second source device access to the data in the particular logical data storage area that is assigned to the first source device.

In some implementations, the source device is a first source device, and the non-volatile storage device has a shared data storage area, the apparatus allow multiple source devices to access data in the shared data storage area, and the operations further include: displaying, on the touchscreen, a user interface that (i) identifies files and folders stored in the particular logical storage area assigned to the first source device, and (ii) includes user-selectable controls for selecting files and folders in the particular logical storage area assigned to the first source device; receiving, through the touchscreen, user input that indicates interaction with the user-selectable controls to specify a subset of the files and folders stored in the particular logical storage area assigned to the first source device; receiving, through the touchscreen, user input indicating that the selected subset of the files and folders should be made accessible to devices other than the first source device; and in response to receiving the indicating that the selected subset of the files and folders should be made accessible to devices other than the first source device, copying the files and folders in the selected subset from the particular logical data storage area to the shared data storage area.

In some implementations, the source device is a first source device, and the non-volatile storage device has a shared data storage area, and the apparatus allows multiple source devices to access data in the shared data storage area. The operations further include: receiving, through the touchscreen, user input that selects, from among files and folders in the shared data storage area, one or more files that were copied to the shared data storage area from the particular logical data storage area that is assigned to the first source device; receiving, through the touchscreen, user input that requests a transfer of the selected one or more files from the shared data storage area to (i) a second source device that is different from the first source device, or (ii) a logical data storage area of the non-volatile storage device that is assigned to the second source device; and in response to receiving the user input that requests the transfer, transmitting a copy of the selected one or more files to (i) the second source device, or (ii) the logical data storage area assigned to the second source device.

In some implementations, causing the device driver to be (i) transmitted from the apparatus to the source device and (ii) installed on the source device includes: retrieving the identifying information from the source device includes receiving an operating system identifier for an operating system of the source device; selecting the device driver includes selecting, based on the operating system identifier, a device driver designated for an operating system indicated by the operating system identifier, the device driver being selected from among multiple device drivers that are stored by the apparatus and that are each designated for use with a different operating system.

In some implementations, the operations further include: receiving a vendor identifier for the source device and a product identifier for the source device; selecting the device driver includes selecting, based on the vendor identifier and the product identifier, a device driver designated for a type of device that is indicated by the combination of the vendor identifier and the product identifier In some implementations, the operations further include: retrieving the identifying information from the source device includes receiving a device identifier for the host; and selecting the device driver includes selecting, based on the device identifier, a device driver designated for a type of device indicated by device identifier.

In some implementations, one or more features may include an apparatus where the non-volatile data storage device is a hard disk drive or a solid state drive.

In some implementations, one or more features may include an apparatus where establishing communication with the source device includes establishing communication with the source device over a Universal Serial Bus connection.

In some implementations, one or more features may include an apparatus where the one or more processors include: a first processor configured to manage communications with the source device; and a second processor configured to process user input received through the touchscreen.

The details of one or more implementations of the subject matter described in this specification are set forth in the accompanying drawings and the description below. Other potential features, aspects, and advantages of the subject matter will become apparent from the description, the drawings, and the claims.

BRIEF DESCRIPTION OF DRAWINGS

FIGS. 2A-2D are diagrams that illustrate views of an example backup device.

Like reference symbols in the various drawings indicate like elements.

DETAILED DESCRIPTION

Figure 1A:
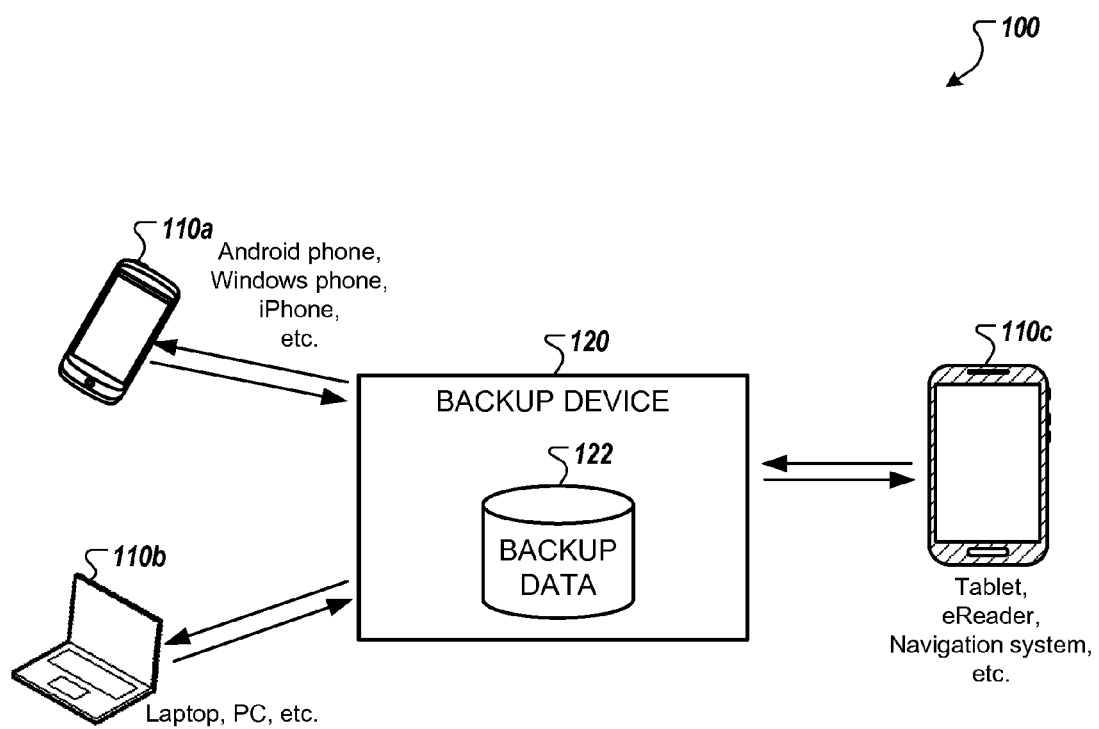
FIG. 1A is a block diagram that illustrates an example of a system for archiving data.

FIG. 1A is a block diagram that illustrates an example of a system 100 for archiving data. The system 100 includes a backup device 120 configured to communicate with various source devices 110a and 110b. In the example, the backup device 120 receives data stored on the source devices 110a and 110b (e.g., document files, multimedia files, and other data) and creates backup data 122 stored within the backup device 120.

The backup device 120 is a portable storage device that includes a touch screen interface, an internal data storage device such as a hard drive or solid state drive, and a universal serial bus (USB) connection port. The backup device 120 connects with the source devices 110a110c through a physical connection (e.g., USB connection) and initiates a data transfer with a source device 110a. The backup device 120 can archive data from many different types of devices. As represented in FIG. 1A, the source device 110a is a mobile device such as a smartphone or personal digital assistant (PDA), which can run any of a variety of operating systems, such as Android, Windows Phone, iOS, and so on. The source device 110b is a computer such as a laptop or a desktop computer which can also run any appropriate operating system, e.g., Windows, MacOS, linux, and so on. The source device 110c represents a tablet computer, eReader device, GPS navigation system, or other device. The source devices 110a-110c are shown as examples of the many different devices for which that backup device 120 archive data. For example, the backup device 120 can be capable of simultaneously storing archived data for 5, 10, or more different devices.

The backup device 120 may communicate with multiple mobile and desktop operating systems such as Android, iOS, Windows and Mac using a software controller module that initially determines the device type of the source device 110a. For example, the software controller of the backup device 120 may read the USB port attributes of the connected source device 110a to determine what operating system the source device 110a is running.

The backup device 120 then generates a touch interface to allow a user to select archiving options. For example, a user may select a "backup" option to create a recovery disk on the hard drive of the backup device 120, or select a "restore" option to copy files previously backed up on the hard drive onto the source device 110a. The backup device 120 then determines the amount of data to be backed up based on the input provided through the user interface. For example, a user may select an option to backup all data from the source device 110a or select an option to backup only selected files from the source device 110a. The backup device 120 then verifies that sufficient space is available on the hard drive of the backup device 120 to allow the specified archiving option.

The backup device 120 may also perform data processing techniques after initiating the archiving process such as error handing routines for unknown or unsupported file types, recovery routines for interrupted archiving processes, data decryptions for encrypted data, file compressions or decompressions, or repartitioning data on the hard drive of the backup device 120 to create space for archived data from the source device 110a.

Figure 1B:
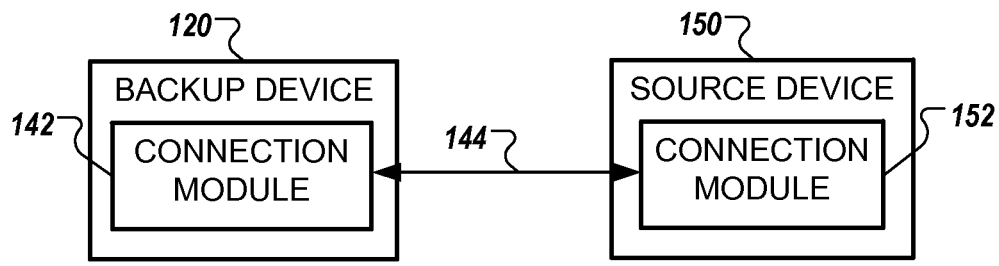
FIG. 1B is diagram that illustrates an examples of connection interface between a storage device and a source device.

FIG. 1B is diagram that illustrates an example of a connection interface 144 between a backup device 120 and a source device 150. The backup device 120 and the source device 150 include connection modules 142 and 152, respectively that allow the backup device 120 to connect to the source device 150. The connection module 142 may include a standard USB A-type or a mini USB B-type connector. The connection module 152 may include a standard USB A-type or a micro USB B-type connector and associated components that support data transfer over a media transfer protocol (MTP), precision time protocol (PTP), and/or mass storage device protocol.

The connection interface 144 may allow data transfer using a USB serial device protocol, which can be used to pass commands and control data between the backup device 120 and the source device 150. In addition, or as an alternative, the connection interface 144 may allow data transfer using a USB mass storage device protocol that provides access to archived file data on the backup device 120, and which may interact with an external device driver running on the source device. In addition, the backup device 120 transmits commands, according to user input received through a graphic user interface from the backup device 120, through the connection interface 144 to the source device 150.

As discussed further below, a driver running on the source device 150 may facilitate data transfer and control by the backup device 120. File transfer operations may be initiated and managed by the backup device 120 rather than the source device 150. In some implementations, the driver on the source device 150 allows the backup device 120 to access the hard drive or other storage of a source device 150 at a low level, without using file system commands to the operating system of the source device 150. As a result, the backup device 120 can initiate commands to the driver running at the source device 150 that allow the backup device 120 to retrieve data directly from the source device 150 while bypassing typical operating system file system access procedures. The commands and data exchanged between the backup device 120 and the driver may be encrypted. For example, the backup device 120 and the driver may exchange encrypted strings containing commands, control parameters, and the like. The backup device 120 may communicate with layered strings of encrypted data to the driver and/or the operating system of the source device 150.

The driver may run on the source device 150 as a phantom process or other background task or job. The driver may also run as a scheduled process, e.g., scheduled with a unix cron functionality or similar, that runs in the background and periodically checks USB ports and other interfaces for the presence of the backup device 120. When the scheduled task detects the presence of the backup device 120, the task initiates the phantom process that communicates with the backup device 120 and provides the backup device 120 access to the file system of the source device 150. In this manner, the backup device 120 is able to retrieve data from the source device 150 or restore data to the source device 150 in a manner that bypasses the operating system of the source device 150 and does not involve file system request to the operating system of the source device 150. This functionality provides seamless and unobtrusive access to the source device 150. It can also minimizes the processing overhead on the source device 150, since the backup device 120 manages and drives the archiving processes.

In some implementations, the controller running on the backup device 120 can pass control of the arching process to or recapture control from the controller implemented by the driver on the source device 150. After an initial stage where the backup device 120 receives a device determination string that identifies the backup device 150, the backup device 120 may send encrypted commands or requests to the driver. Then the backup device 120 may pass control to the driver, which may execute appropriate instructions to carry out the archiving operations. The operations of the driver may include, for example, identifying files that meet certain criteria, compiling data describing a file system, analysis of file characteristics, transmitting file contents, and so on. When the operations of the driver are complete, or if the backup device 120 issues additional commands to retake control, control shifts back to the backup device 120 which can issue new commands or change or abort ongoing operations.

In some implementations, the connection interface 144 may allow the backup device 120 to pass commands and control data between the backup device 120 and source device 150 using a communication protocol directly with the hardware components of source device 150. In these implementations, the backup device 120 may bypass the operating system of the backup device 120 and pass commands directly to the source device 150 using a hardware controller.

The backup device 120 can have an operating system and software processing module that is optimized for efficiency in archiving and restoring data. In some implementations, the software of the backup device 120 is based in part on a linux operating system.

Figure 1C:
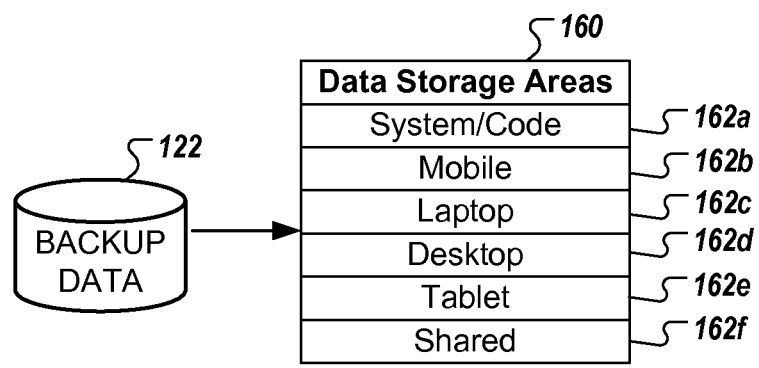
FIG. 1C is a diagram that illustrates partitions on a backup device.

FIG. 1C is a diagram that illustrates data storage areas on a data storage device 160 within the backup device 120. The data storage areas can be logical or physical data storage areas. For example, logical data storage areas can be, for example, separate partitions, directories, or other divisions of a data storage device. In some implementations, the source device 140 stores backup data 122 from different source devices in different data storage areas on the data storage device 160 based on the operating system of the source device 150. For example, when the source device 150 is connected to the backup device 120, the source device 140 initially identifies the operating system of the source device 150 based on the USB standard device information exposed by the connection. The backup device 120 uses this device information to identify a file path for the backup data 122 that corresponds to a specified partition for the operating system within the data storage device 160.

As shown in FIG. 1C, the data storage device 160 may include data storage areas 162a-162f for different devices or operating systems. For example, the data storage area 162a can be assigned to store executable instructions or system data for the backup device 120. The data storage areas 162b-162e may be, respectively, storage areas for different operating systems for mobile, laptop, desktop, and tablet devices, and storage area 162f can be used as a shared storage area for archiving files that can be accessed by multiple different devices.

The data storage device 160 also archives data from multiple connected source devices into assigned data storage areas for each source device. For example, each source device can be assigned an identifier, as discussed below. The backup data for different source devices may be stored in different storage areas within the storage device 160 based on an identifier for the source device. For instance, the data storage device 160 may include separate directories, each corresponding to a different host identifier and storing data from the device associated with the host identifier. As a result, multiple hose devices having the same operating system can each have data stored in a separate data storage area.

Figure 2D:
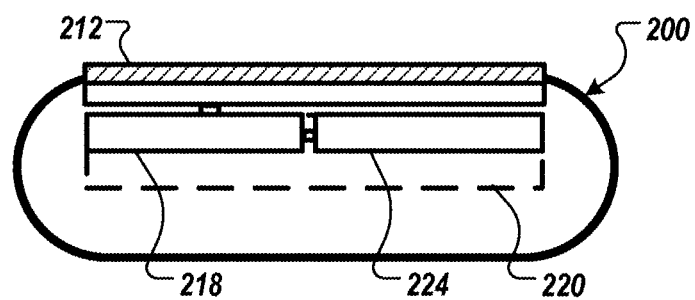

FIGS. 2A-2C are diagrams that illustrate views of an example backup device 200. FIG. 2A represents a top view of the backup device 200, FIG. 2B represents a perspective view of the backup device 200, FIG. 2C represents a side view of the backup device 200, and FIG. 2D represents a top view of the backup device 200. As shown in FIG. 2A, the backup device 200 includes an external storage module 210, a touchscreen 212, a power button 214, a device interface 216 on the external casing or housing 213 of the backup device 200.

As shown in FIG. 2B, the backup device 200 includes internal hardware components such as a motherboard 218, a storage device 220, and a battery 222.

Referring now to FIG. 2A, the external storage module 210 is a memory card reader used to communicate with smart cards or memory cards such as CompactFlash, Secure Digital or MultiMediaCards cards. The external storage module 210 accesses a connected memory card to access files stored on the memory card. In some implementations, when the external storage module 210 detects an inserted memory card into the module, the backup device 200 may present a user interface on the touchscreen 212 to allow the user to select files to transfer to the storage device 220 from the connected memory card.

The touchscreen 212 is an electronic visual display that allows a user to provide input to the backup device 210 through a touch user interface. The user may provide input using simple touch or multi-touch gestures by touching the screen with either a special stylus or pen such as an active digitizer or using touch input. The touchscreen 212 also accepts commands from the user. As discussed below, the backup device 200 is configured to user input that indicates a variety of commands, such as selecting specific files to transfer from a source device to the backup device 210, selecting an archiving option (e.g., backup, restore, etc.), and navigating through file directories within the interface that represent the files that are stored within the storage device 220. The backup device 200 may cause documents and images to be displayed at the touchscreen 212, for example, to show users previews of documents or images through thumbnails presented through the user interface. For example, the touchscreen 212 may show the user slideshows of images within a specified file directory.

The device interface 216 allows the backup device 200 to exchange communications with a connected source device to archive data stored on the source device or transfer data stored on the storage device 220 to the connected source device. For example, in some implementations, the device interface 216 may be a USB port that allows the backup device 200 to connect to a source device using a USB cable. The device interface 216 reads the port attributes of the connected source device to determine the device type and the operating system of the connected source device. The port attributes may be queried to a device controller to create unique device identifier for the connected source device.

The device interface 216 also determines the status of the connected source device prior to any archiving processes carried out by the backup device 200. For example, the device interface 216 may receive data transmissions from the connected source device indicating whether the source device is available or unavailable to initiate a data archiving process such as a file transfer from the source device to the storage device 220.

Referring to FIG. 2B, the motherboard 218 is a printed circuit board that includes a central processing unit (CPU), random access memory (RAM), and connectors to execute the archiving operations carried out by the backup device 200. For example, the CPU of the motherboard 218 controls access to partitions of the storage device 220, initiates and terminates file processes between the source device and the backup device 200, enables the user interface to be presented to a user on the touchscreen 212, and creates computer-implemented protocols to determine whether the connected source device has been previously archived with the backup device 200. In some implementations, the motherboard and associated components are an independent computing system that can drive the archiving process.

The storage device 220 is a non-volatile data storage device such as a flash memory device or a magnetic storage device. The storage device includes different logical storage areas (e.g., drive partitions, directories, etc.) for storing archived data from the connected source device. For example, the storage device 220 may be a hard disk drive configured with partitions for various source devices or various operating systems as represented in FIG. 1C. The storage device 220 may be used by the backup device 200 to store data from multiple source devices that were separately connected to the backup device 200 at different times. The data from these devices may be from device of different device types (e.g., smartphone, tablet, laptop, etc.), and the data may be stored simultaneously within specified storage areas within the storage device 220. In some implementations, a different logical storage area, e.g., a different partition or directory, may be assigned for each source device.

In some implementations, the storage device 220 may include a shared storage area, in addition to specified storage areas for source devices. The shared area can be used for indexing, storing, synchronizing, and retrieving documents and other data stored on the storage device 220. In such implementations, the backup device 200 may use the shared storage area to more easily carry out user commands received through the user interface of the touchscreen 212. For example, the backup device 200 may store thumbnail previews and icon graphics for the user interface within the shared storage space.

In other instances, the shared storage area may be utilized for copying files between specified storage areas within the storage device 220, or from the storage device 220 to source devices. For example, if a user has archived data from two different source devices (e.g., a smartphone and a tablet) onto the backup device 200, the user may use the user interface to transfer files between the separate storage areas for each respective device by initially transferring files to the shared storage area, then to the data storage area for the other device.

The storage device 220 is also used to store drivers of multiple types of connected source devices. Drivers are transferred from the storage device 220 to the connected source device when a new source device has not been previously connected with the backup device 200.

The battery 222 is a portable rechargeable lithium-ion battery used as a power supply for the archiving operations performed by backup device 200. In some implementations, the battery 222 may be replaceable through a removable compartment in the external casing of the backup device 200 to allow use with multiple portable battery units.

Referring to FIG. 2D, some implementations of the backup device 120 include a daughterboard or card that is physically separate from the motherboard 218. The daughterboard 224 is a printed circuit board or card configured to operate the touch screen 212. The daughterboard 224 includes a CPU and RAM to control the processes involving the touch screen 212 such as preparing and providing the user interface, receiving user input and processing the user input to initiate computer-implemented protocols in response to the user input.

In some implementations, the daughterboard 224 may be configured to operate independently from the motherboard 218, or at least perform some tasks independently, to reduce memory usage, CPU usage, and other resource usage for the processing system on the motherboard 218. By offloading touchscreen processing to the processor of the daughterboard 224, the processor of the motherboard 218 has more available processing capacity for data transfer and other archiving operations. For example, the motherboard 218 may control the data archiving operations on between the backup device and the source device, while the daughterboard 224 may process the user input identifying the files that need to be archived.

The daughterboard 224 can also allow the device to have a lower profile, e.g., to minimize the height of the device perpendicular to the touchscreen. The daughterboard 224 can be oriented parallel to the motherboard 218 and in the same plane as the motherboard 218.

Figure 3A:
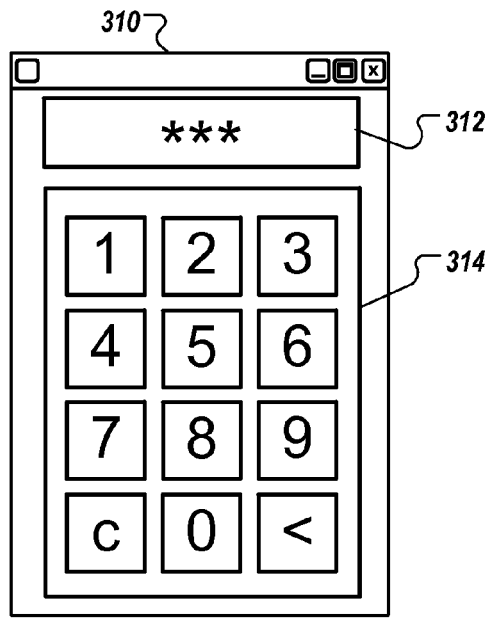
FIGS. 3A-3D are diagrams that illustrate example user interfaces.
Figure 3B:
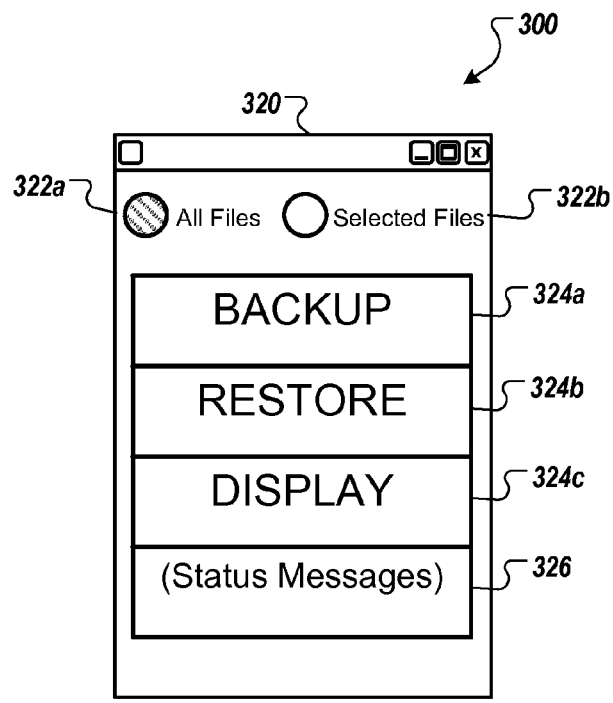
Figure 3C:
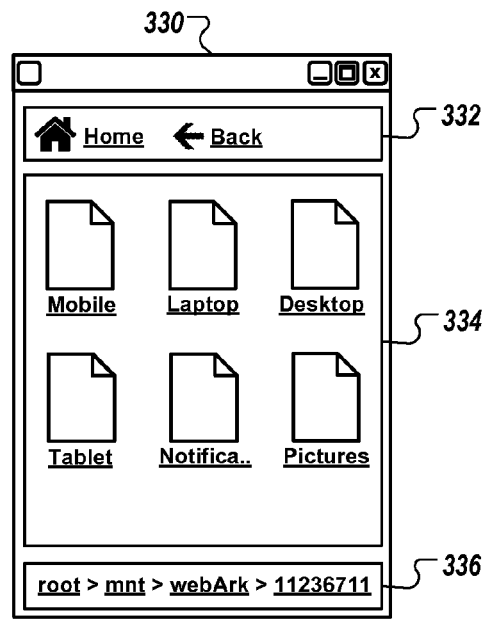
Figure 3D:
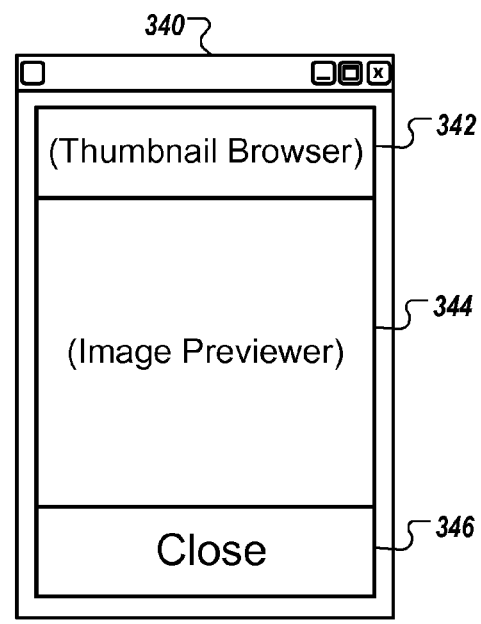

FIGS. 3A-3D are diagrams that illustrate example user interfaces that are provided by the backup device 200. Briefly, FIG. 3A illustrates an example lock screen interface 310, FIG. 3B illustrates an example archive selection interface 320, FIG. 3C illustrates and example file browser interface 330, and FIG. 3D represents file preview interface 340. The interface 300 is presented to the user on the touchscreen 212 of the backup device 200.

Referring to FIG. 3A, lock screen interface 310 includes a type display 312 and a number pad 314. The lock screen 310 allows the user to restrict access to the interface 300 by requiring the user to submit a preset passcode. The lock screen 310 is initially presented to the user when the backup device 200 is initially powered on or after it has been inactive for a certain period of time (e.g., five minutes). When a user is presented with the lock screen interface 310, the user is directed to provide an input that consists of a personal identification number that allows access to the user interface 300. The user may provide such input using the number pad 314 by providing a touch input over the displayed numbers on the touchscreen 212. The corresponding user input is indicated with displayed symbol icon on the type display 312.

Once the user successfully provides the correct personal identification number, the user may be directed to the archive selection interface 320 to specify the type of archiving process to initiate with the connected source device. The archive selection interface 320 includes two radio buttons 322a and 322b, which allow the user to specify whether all the files or only specified files will be archived, respectively. The archive selection interface 320 also includes selection buttons 324a, 324b, and 324c, which allow the user to select either the "backup", "restore", or "display" options, respectively. Finally, the archive selection interface 320 includes a status message 326, which shows any relevant information relating to an archive process such as the status of the source device (e.g., ready for archiving), the total size of the data on the connected source device, the remaining storage space available on the backup device 200, or file transfer information regarding the last archiving process with the same connected source device.

When a user selects the radio button 322b, the user may be directed to the file browser interface 330, where the user may provide selections of specific files to perform archiving operations on, or the user may view file contents of existing archived data on the backup device 200. The file browser interface 330 includes a navigation pane 332, which allows the user to between hierarchal file directories, a file selection pane 334, which displays files stored within a specified directory, and a file directory 336, which displays the current file directory of the file selection pane 334. The user may return to the archive selection interface 320 by providing an input over on "Home" button as shown in navigation pane 332. Similarly, a user may provide an input on the "Back" button to revert back to a previous screen within the interface 300. The file selection pane 334 includes views of specified files or folders stored within the file directory 336.

In some implementations, upon providing an input over an icon within the file selection pane, the user may be presented with multiple options of actions to be taken on the specified file. For example, a user may be presented with an option to change the viewing options for the icon, add the file to an archive query, manipulate the file (e.g., copy, paste, cut, rename, delete, etc.), or be directed to the file preview interface 340 to view a preview of the file. Because the backup device 200 includes its own battery, processor, memory, and operating system, the backup device 200 may operate independently of any source device. This included permitting the user to interact with the user interface and view and manipulate files when the backup device 200 is not connected to any source device.

The file preview interface 340 includes a thumbnail browser 342, which allows the user to browse thumbnails of files within a specific directory, an image previewer 344, which generates a cached representation of the file contents, and a button 346, which redirects the user to the file browser interface 330. For example, the thumbnail browser 342 may indicate a directory of specified files, and the backup device 200 may be able to provide a preview of each of the specified files on the user interface 300. In such examples, the backup device 200 may examine the files within a specified directory and determine whether the files present are capable of generating a preview thumbnail. The backup device 200 may then selectively represent only those files within the directory that may have previews. In another example, the thumbnails may be stored in a shared storage location within the storage space of the backup device 200, and the backup device 200 may initiate a computer-implemented protocol to access and display the thumbnails using a file directory mapping between the file directory and a cached directory within the shared storage space. The image previewer 344 may display an image for multiple files (e.g., text documents, images, etc.) and provide a rendering for the viewer to see. In some implementations, the user may be able to perform simple navigational commands such as zooming in or scrolling to examine the preview image.

Figure 4:
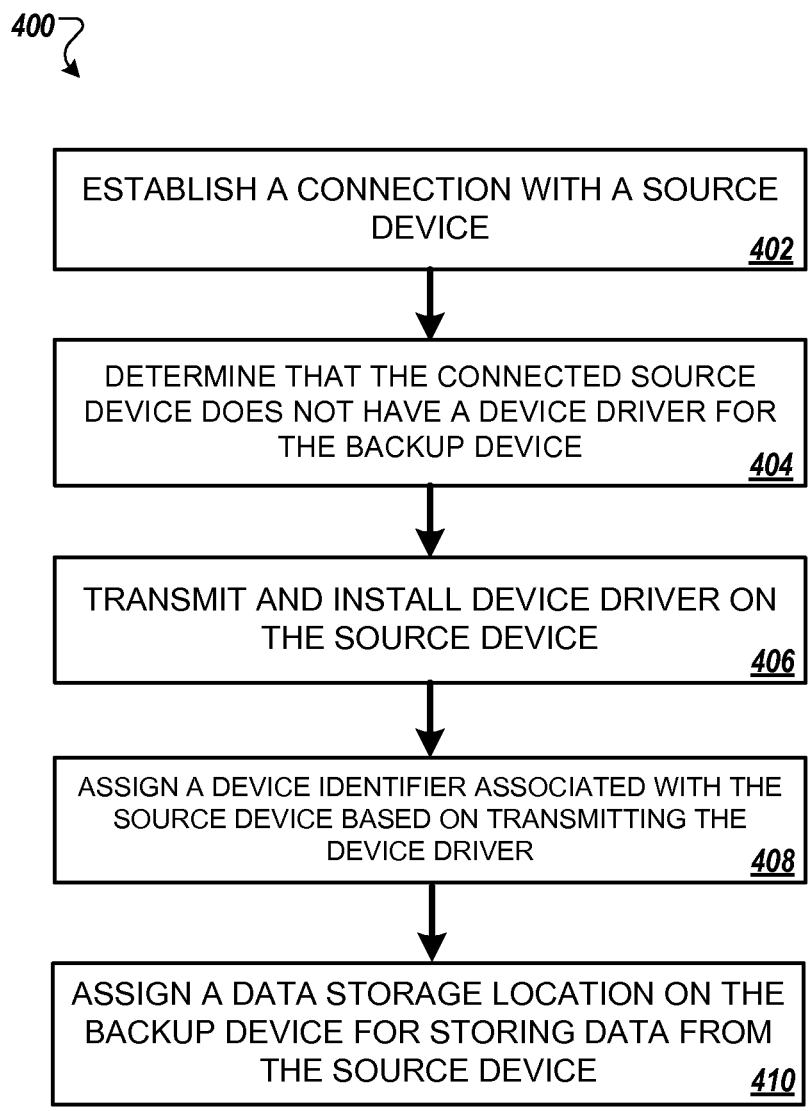
FIG. 4 is a flow diagram that illustrates an example of a process for connecting a storage device to a source device.

FIG. 4 is a flow diagram that illustrates an example of a process 400 for connecting a backup device to a source device. Briefly, the backup device 200 establishes a connection with a source device (402). The backup device 200 determines that the connected source device does not have a device driver for the backup device (404). The backup device 200 transmits and installs device drivers on the source device (406). The backup device 200 assigns a device identifier associated with the source device based on transmitting the device driver (408). The backup device 200 assigns a data storage location on the backup device for storing data from the source device (410). The process 400 of FIG. 4 is an example of a process that can be used the first time a particular source device connects to the backup device, to facilitate later backup and restore operations.

The backup device 200 establishes a connection with a source device (402). For example, the backup device 200 initially detects the connection with the source device using a device module that initiates a connection negotiation by exchanging data between the devices. In some implementations, the backup device 200 and the source device communicate via a physical connection such as a USB connection between two connector ports. In some implementations, the backup device 200 and the source device communicate over a wireless connection, such as Bluetooth or Wi-Fi. The backup device 200 and the source device may also communicate using various connection protocols such as media transfer protocol (MTP), picture transfer protocol (PTP), and/or USB mass storage protocols. After the connection negotiation has been performed, and a connection has been established, the backup device 200 identifies the source device type and its operating system by receiving device information from the connected source device through the device module of the backup device 200.

The backup device 200 can obtain information about the source device when the connection is established. For example, the backup device 200 may request and receive a vendor identifier (VID) and product identifier (PID) that respectively indicate the manufacturer and model of the source device. From this information, or additional identifiers retrieved from the source device, the backup device 200 can determine the type of device and operating system of the source device.

The backup device 200 determines that the connected source device does not have a device driver for the backup device 200 (404). For example, the backup device 200 may make a request to the source device that would be handled by the driver. If the request is not appropriately answered the backup device determines, based on the incorrect response or lack of a response, that the source device is not running an appropriate device driver required to initiate a data archiving operation. As another example, the backup device 200 may request an identifier for the source device or attempt to access a file on the source device, and may receive an indication that the identifier or file does not exist or is not accessible. The need for a driver may be determined from this indication from the source device. For example, the backup device 200 may search a predetermined folder location on the source device for a file containing a device identifier, e.g., a universally unique identifier (UUID). If a file containing a UUID is not found, then the backup device 200 determines that a driver should be transferred and installed.

In some implementations, the backup device 200 determines, based on the operating system and the device type of the connected source device, the appropriate device driver required by the connected source device to initiate a data archiving operation. The backup device 200 then searches specified file directories on the connected source device to determine if the device driver is presently stored on the source device. For instance, the backup device 200 recognizes the file structure of the connected source device and determine an appropriate searching technique based on the operating system of the connected source device. The backup device 200 then searches for the device driver file stored on the source device by searching against known attributes of the device driver file such as metadata, filename extensions, or file hashes. After performing the search, the backup device 200 determines that the connected source device does not have a device driver for the backup device 200 if it is unable to locate the device driver within the searched file directories of the connected source device.

The backup device 200 transmits and installs one or more device drivers on the source device (406). The first time the backup device 200 is connected to a source device, or if the host does not have an appropriate driver, the backup device 200 transmits a driver to facilitate communication with the backup device 200. First, if not performed already, the backup device 200 may select the driver that is appropriate for the source device from among drivers for several different device types or operating systems. This selection may be made based on a device identifier, operating system identifier, or other data retrieved from the source device. The backup device 200 then transmits the selected driver to the source device, and the source device installs the driver.

The backup device 200 causes a device identifier to be associated with the source device (408). In some implementations, an identifier for the source device is generated as part of installing the driver for the backup device 200. For example, an installation program transferred from the backup device 220 can execute on the source device to install the driver. The installation program, or the driver itself, may cause the source device to determine and store an identifier for the source device in a standard location. The driver may use information from the source device or information about characteristics of the source device to create the identifier. For example, the identifier created may be a UUID, such as one created according to the Request for Comments 4122 of the Internet Engineering Task Force (IETF) and the Internet Society. For example, the identifier may be a 128-bit value that is the result of a hashing algorithm, such as the MD5 or SHA-1. The UUID can be a value that is practically unique rather than guaranteed to be unique. In other words, the identifier can be generated according to a process designed so that the likelihood of two different devices having the same identifier is below a desired threshold, e.g., 1%, 0.1%, 0.001% and so on. Inputs to a hash function used to generate the identifier can include, for example, a timestamp, a date, a system time of the source device, a random or pseudo random number, information about the source device (such as an identifier for the device type or operating system), and combinations of these items and/or other data. After being generated, the identifier for the source device can be transmitted to the backup device 200 for use in future interactions with the backup device 200, including in later communication sessions after the connection between the source device and the backup device 200 has been broken and later re-established.

In some implementations, the backup device 200 may determine the identifier for the source device, and may transfer a file containing the identifier to the connected source device, where the identifier may be stored in a standard location (e.g., a predetermined file directory) for later use.

In some implementations, the backup device creates an identifier file that includes an identifier for the connected source device and stores the identifier file on the connected source device. The backup device 200 initially searches known paths on the source device for an existing identifier file. If the backup device 200 is unable file an existing identifier file, it generates a new identifier file and transmits it to a predetermined location as indicated in step 406.

In some implementations, the backup device 200 may store data that maps the identifiers for different source devices to information about the corresponding source devices. For example, source device identifiers may be mapped to metadata about the respective source devices that indicates, for example, attributes of the source device or other information.

The backup device 200 assigns a data storage location on the backup device for storing data from the source device (410). For example, the backup device 200 may create a new directory on the connected source device to store the generated device identifier file. The backup device 200 may initially determine an appropriate directory based on the device type and/or operating system of the connected source device. For example, the storage within the backup device may be organized with different partitions or directories for different device types (e.g., phone, tablet, laptop, desktop, etc.), and additional directories within those partitions or directories may be designated for specific operating systems or operating system versions.

The backup device 200 may then create a new directory within the non-volatile storage of the backup device 200 using the text of the unique identifier, the operating system of the connected device and the device type of the connected device to generate a new directory. For example, for an Android phone, the backup device 200 may create a new directory such as "/Phone/Android/data/UIUD_123456" where the "UIUD-13456" corresponds to the text of the unique identifier and the folder location of the corresponding device driver. The backup device 200 assigns this directory within the non-volatile storage of the backup device 200 as the archive path for all operations for the specific connected source device.

In some implementations, the backup device 200 may deny access (e.g., deny read access, write access, or both), by a second connected source device, to the file directory for the unique identifier assigned to a first connected source device. For example, the backup device 200 may assign the directory by unique identifier and set file permissions to prevent access to directories by connected source devices with different device identifiers. For example, the backup device 200 may hide the file directories associated with different device identifiers such that the operating system of the connected device is unable to access these file directories. In another example, the backup device 200 may implement a device identifier verification process prior to providing read and write access to the file directories within the backup device 200 to a connected source device. In this example, the backup device initially verifies that the device identifier of the connected source device matches the associated device identifier for each file directory before providing read and write access to the file directories within the storage device of the backup device 200.

Figure 5:
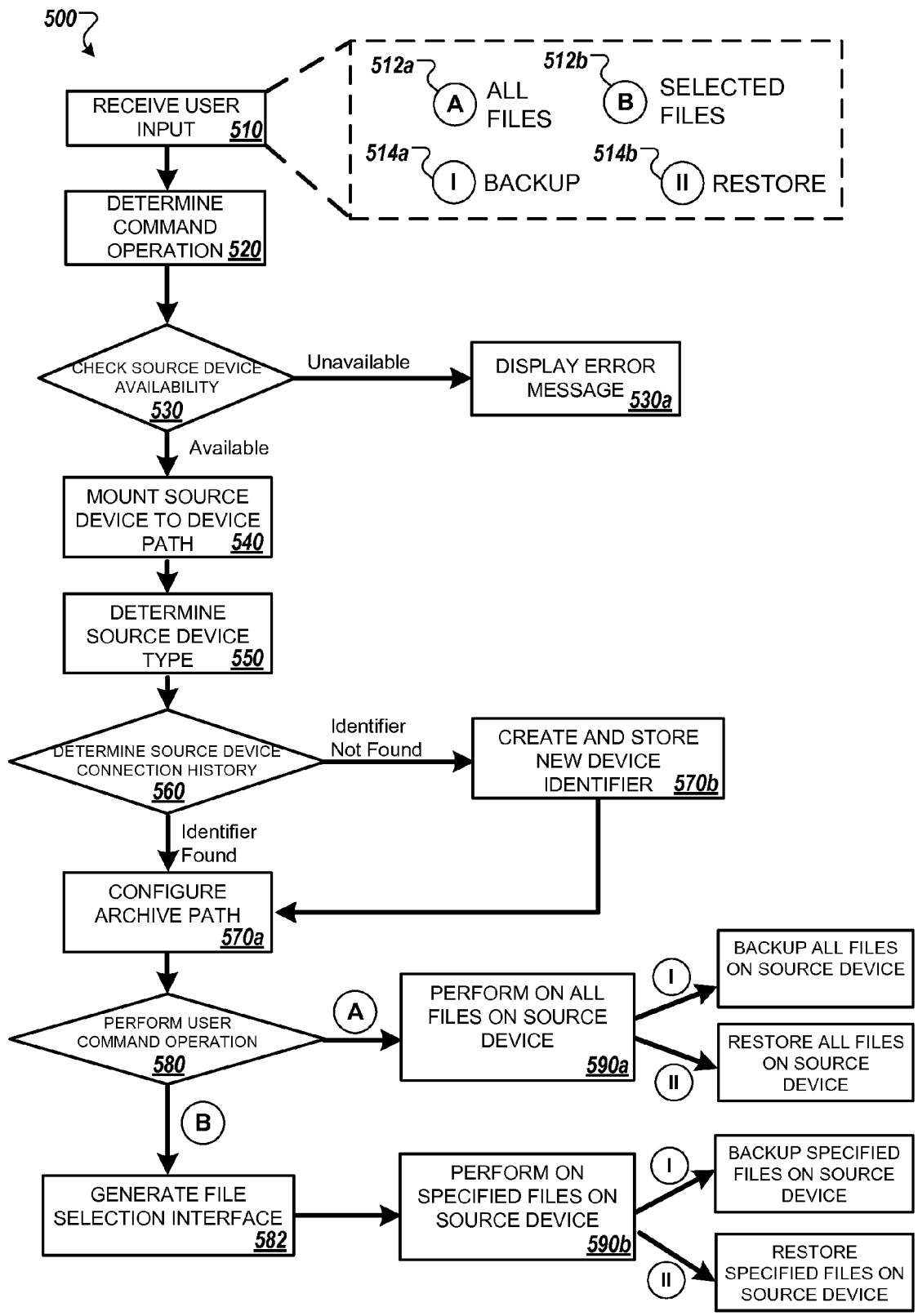
FIG. 5 is a flow diagram that illustrates an example of a process for backing up and restoring information on a source device.

FIG. 5 is a flow diagram that illustrates an example of a process 500 for backing up and restoring information on a source device. Briefly, the backup device 200 receives a user input (510), the backup device 200 determines a command to perform (520), the backup device 200 checks source device availability (530), the backup device 200 mounts the source device to a specified path (540), the backup device 200 determines the source device type (550), the backup device 200 determines the source device prior connection history (560), the backup device 200 configures the archive path (570a), and the backup device 200 performs a user command (580), which may apply to all files on the source device (or all files meeting certain criteria) (590a) or to one or more user-specified files on the source device (590b).

The system 500 receives user input through a user interface on the backup device 200 (510). The user input indicates an archive operation to be performed and a selection of the files to be archived. For example, a user command, received through the touchscreen of the backup device 200, specifies a selection of one of options 512a or 512b to perform an archiving operation on all files stored on a source device or selected files stored on a source device, respectively. As another example, for files of the source device already stored on the backup device 200, the options 512a, 512b can be used to select whether an operation refers to all files or only some files stored on the backup device 200. When a user selects option 512b, the user interface may redirect the user to a file browser interface 330, as shown in FIG. 3C.

The user input may also specify one of options 514a and 514b to perform a backup operation or a restore operation, respectively. When "backup" option 514a is selected, the backup device 200 initiates operations to copy files on the source device, e.g., either all files or selected files identified by the user input, to the storage device of the backup device 200. When option 514b is selected, the backup device 200 initiates an archiving operation that includes copying files on the storage device of the backup device 200, identified by the user input, to the source device.

The backup device 200 determines the command to perform based on processing the user input provided on the user interface (520). For example, in response to a received user input, the backup device 200 determines which user interface element the user interacted with and which operations are associated with that user interface element.

The backup device 200 then determines if the source device is available to participate in an archive operation (530). For example, the backup device 200 may monitor the connection between the backup device 200 and the source device to ensure that the devices are still available to exchange files. In this example, the backup device 200 may perform a test to verify that the connection still exists between the two devices. If the backup device 200 detects that the connection with the source device has been lost, then it will send an instruction to the user interface to present a display error message to the user (530a). For example, the display error message may be a notification directing the user to check the physical connection between the source device and backup device 200, or a notification indicating that the connection has been lost. In some examples, the user may be presented with an option to retest the connection between the source device and the backup device 200 after adjusting the connection between them.

In some implementations, the backup device 200 may attempt to reestablish the connection with the source device if the connection is lost after establishing an initial connection. For example, the backup device 200 may determine if the source device was previously connected to the backup device by searching specific locations of the source device for a unique identifier file. In some examples, the directory where the unique identifier file is location may also contain a log file that provides a connection summary (e.g., data transmissions, time of connection being established, connection duration), which allows the backup device 200 to determine if the source device has been previously connected to the backup device

200. In other examples, if the backup device 200 may store activity logs of prior connections in a cache located within a shared location within the storage space in the backup device 200. In such examples, the backup device 200 may initially parse the activity logs to match device attributes exposed through the connection to determine if the source device has been previously connected with the backup device 200.

The backup device 200 then mounts the device to the device path (540). For example, the backup device 200 detects the storage medium of the connected source device and runs a computer-implemented script to determine the file structure and organization of the data stored on the connected source device. For instance, the backup device may create a mounted folder with a drive letter so it can associate the data stored on the source device with an identified file directory.

The backup device 200 then determines the source device type (550). For example, the backup device 200 reads the device attributes from the established connection with the source device. The backup device 200 determines the operating system (e.g., Android, iOS, Windows, Mac, etc.) and the device type (e.g., smartphone, tablet, laptop, phone). Based on determining the source device type, the backup device 200 initiates a computer-implemented instruction to store the device information from the source device. In some implementations, the source device type has previously been determined, for example, when the connection with the source device is established.

The backup device 200 then determines the prior connection history of the source device (560). For example, if not performed previously, the backup device 200 may search for a device identifier file stored on the storage medium of the source device to determine if the backup device 200 has previously connected with the source device. If the backup device is unable to find an associated device identifier file on the source device, the backup device 200 causes a new device identifier to be created and stored (570b). For instance, the backup device may search an expected file directory within the source device based on the operating system of the source device and search for an expected filename or file type based on the source device attributes.

If the backup device 200 locates a device identifier associated with the source device, then the backup device 200 configures the archive path (570a). The archive path is a specified location within the storage device of the backup device 200 where the archived files from the source device are stored. For example, the archive path is a directory that is specific to the source device using the device identifier. In this example, the backup device 200 associates the archive path with the unique device identifier to prevent archiving of data from other connected source devices. In some implementations, the archive path is stored in a configuration file for reference in all archiving operations after the backup device 200 creates a new device identifier file.

The backup device 200 then performs the command specified by the received user input (582). For instance, if the user specifies option 512a to archive all files, the backup device 200 proceeds with Step A and performs the operation on all files on the source device (590a). If the user specifies option 512b to archive selected files, then the backup device generates a file selection interface to allow the user to select specific files to archive (582). For example, the backup device 200 may generate the file selection interface 330 as represented in FIG. 3C. To display the file selection interface 330, the backup device 200 requests file and directory information from the source device. The user interface of the backup device 200 displays a list of the files and directories indicated by the source device, to indicate the files stored on the source device. The user selects the files by providing, for example, a touch input, and confirming that they have made a file selection. The backup device 200 then performs the command on the specified files on the source device (590b).

Based on the received user input, the backup device 200 performs a specified archive operation. For example, as illustrated by FIG. 5, the source device may backup files on the source device by initiating a file transfer between the source device and the backup device 200 to create a copy of the files on the storage device of the backup device 200. In another example, the backup device 200 may restore the data on the source device by transferring previously backed up files stored on the source device to the storage medium of the source device.

In some implementations, the backup device 200 may initially delete the current instance of the files on the source device prior to performing the restore operation to create storage space for transferring the files to be restored. In other implementations, the backup device 200 may initially perform a backup of the current instance of the files on the source device within a cached location within the backup device (e.g., shared storage location) prior to performing the restore operation to ensure that the user is able to revert back to current instance of the files if the restore operation fail. In another implementation, the user may be presented with an interface allowing the user to select a backup option prior to performing a restore operation. In this implementation, the backup device 200 carries out the necessary restore operations based on the received user input.

In some implementations, the backup device 200 can be configured to automatically identify user files on a source device and backup and restore only the user files. For example, if the option is selected by a user, operating system files and application files may be omitted from the backup and restore operations. User files may be identified based on, for example, the folders or other locations where the files are located, permissions or attributes of the files, file types or file names, and/or the file contents. For example, text documents, spreadsheets, and media files such as images, videos, and sound files can be considered user files, while executable files may not be. As another example, files in a user folder may be considered user files, while files in application or operating system folders may be considered system and application files, respectively.

A number of implementations have been described. Nevertheless, it will be understood that various modifications may be made without departing from the spirit and scope of the disclosure. For example, various forms of the flows shown above may be used, with steps re-ordered, added, or removed.

Embodiments and all of the functional operations described in this specification may be implemented in digital electronic circuitry, or in computer software, firmware, or hardware, including the structures disclosed in this specification and their structural equivalents, or in combinations of one or more of them. Embodiments may be implemented as one or more computer program products, i.e., one or more modules of computer program instructions encoded on a computer-readable medium for execution by, or to control the operation of, data processing apparatus. The computer readable-medium may be a machine-readable storage device, a machine-readable storage substrate, a memory device, a composition of matter affecting a machine-readable propagated signal, or a combination of one or more of them. The computer-readable medium may be a non-transitory computer-readable medium. The term "data processing apparatus" encompasses all apparatus, devices, and machines for processing data, including by way of example a programmable processor, a computer, or multiple processors or computers. The apparatus may include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) may be written in any form of programming language, including compiled or interpreted languages, and it may be deployed in any form, including as a standalone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer may be embedded in another device, e.g., a tablet computer, a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD-ROM and DVD-ROM disks. The processor and the memory may be supplemented by, or incorporated in, special purpose logic circuitry.

To provide for interaction with a user, embodiments may be implemented on a computer having a display device, e.g., a CRT (cathode ray tube) or LCD (liquid crystal display) monitor, for displaying information to the user and a keyboard and a pointing device, e.g., a mouse or a trackball, by which the user may provide input to the computer. Other kinds of devices may be used to provide for interaction with a user as well; for example, feedback provided to the user may be any form of sensory feedback, e.g., visual feedback, auditory feedback, or tactile feedback; and input from the user may be received in any form, including acoustic, speech, or tactile input.

Embodiments may be implemented in a computing system that includes a back end component, e.g., as a data server, or that includes a middleware component, e.g., an application server, or that includes a front end component, e.g., a client computer having a graphical user interface or a Web browser through which a user may interact with an implementation of the techniques disclosed, or any combination of one or more such back end, middleware, or front end components. The components of the system may be interconnected by any form or medium of digital data communication, e.g., a communication network. Examples of communication networks include a local area network ("LAN") and a wide area network ("WAN"), e.g., the Internet.

The computing system may include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations, but rather as descriptions of features specific to particular embodiments. Certain features that are described in this specification in the context of separate embodiments may also be implemented in combination in a single embodiment. Conversely, various features that are described in the context of a single embodiment may also be implemented in multiple embodiments separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems may generally be integrated together in a single software product or packaged into multiple software products.

Thus, particular embodiments have been described. Other embodiments are within the scope of the following claims. For example, the actions recited in the claims may be performed in a different order and still achieve desirable results.

What is claimed is:

1. An apparatus comprising:
   a touchscreen;
   one or more processors;
   a battery;
   a non-volatile data storage device, the non-volatile data storage device having a plurality of different logical data storage areas; and
   machine-readable media storing executable instructions that, when executed by the one or more processors, cause the apparatus to perform operations comprising:
   establishing communication with a source device;

determining that the source device does not have a device driver for the apparatus;

in response to determining that the source device does not have a device driver for the apparatus, causing the device driver to be (i) transmitted from the apparatus to the source device and (ii) installed on the source device, the device driver being configured to generate an identifier for the source device and store the identifier at the source device;

receiving the identifier for the source device;

assigning, based on the received identifier for the source device, a particular logical data storage area of the non-volatile data storage device for storing data from the source device, the particular logical data storage area being assigned to the source device such that the apparatus disallows other source devices from accessing data from the particular logical data storage area;

displaying, on the touchscreen, a user interface comprising user-selectable controls that permit a user to indicate data to be archived using the apparatus;

receiving, through the user interface displayed on the touchscreen, user input that indicates data on the source device to be archived to the non-volatile data storage device;

in response to receiving the user input through the user interface displayed on the touchscreen, retrieving, from the source device, the data indicated by the user input; and storing the retrieved data at the non-volatile data storage device in the particular logical data storage area assigned to the source device.

2. The apparatus of claim 1, wherein causing the device driver to be transmitted and installed comprises causing a device driver to be transmitted and installed wherein the device driver is configured to cause the source device to generate a universally unique identifier for the source device using a hash function.

3. The apparatus of claim 1, wherein the non-volatile data storage device has logical data storage areas that are respectively assigned to different source devices, wherein for each assigned logical data storage areas, the apparatus is configured to (i) allow the assigned source device to access the logical data storage area by and (ii) disallow access to the data storage area by devices other than the assigned source device.

4. The apparatus of claim 1, wherein the operations further comprise:

after the source device has been disconnected from the apparatus, re-establishing communication between the apparatus and the source device;

receiving the identifier for the source device;

determining, based on the identifier, that the particular logical data storage area is assigned to the source device;

receiving, through the touchscreen, user input requesting to restore, to the source device, data that corresponds to the source device and that is stored by the non-volatile data storage device; and transferring data from the particular logical data storage area to the source device.

5. The apparatus of claim 1, wherein the operations further comprise:

establishing communication between the apparatus and a second source device that is different from the first source device;

receiving an identifier for the second source device;

identifying, based on the identifier, a second logical data storage area of the non-volatile data storage device that is assigned to the second source device, the second logical data storage device being different from and separate from the particular logical data storage area;

receiving, through the touchscreen, user input indicating data of the second source device to be archived using the apparatus; and storing the data indicated by the user input in the second logical data storage area of the non-volatile data storage device.

6. The apparatus of claim 1, wherein the source device is a first source device, and wherein the operations further comprise:

establishing communication between the apparatus and a second source device that is different from the first source device;

receiving an identifier for the second source device; and based on the identifier for the second source device, denying the second source device access to the data in the particular logical data storage area that is assigned to the first source device.

7. The apparatus of claim 1, wherein the source device is a first source device, and wherein the non-volatile data storage device has a shared data storage area, the apparatus allowing multiple source devices to access data in the shared data storage area;

wherein the operations further comprise:

displaying, on the touchscreen, a user interface that (i) identifies files and folders stored in the particular logical data storage area assigned to the first source device, and (ii) includes user-selectable controls for selecting files and folders in the particular logical data storage area assigned to the first source device;

receiving, through the touchscreen, user input that indicates interaction with the user-selectable controls to specify a subset of the files and folders stored in the particular logical data storage area assigned to the first source device;

receiving, through the touchscreen, user input indicating that the selected subset of the files and folders should be made accessible to devices other than the first source device; and in response to receiving the indicating that the selected subset of the files and folders should be made accessible to devices other than the first source device, copying the files and folders in the selected subset from the particular logical data storage area to the shared data storage area.

8. The apparatus of claim 7, wherein the operations further comprise:

receiving, through the touchscreen, user input that selects, from among files and folders in the shared data storage area, one or more files that were copied to the shared data storage area from the particular logical data storage area that is assigned to the first source device;

receiving, through the touchscreen, user input that requests a transfer of the selected one or more files from the shared data storage area to (i) a second source device that is different from the first source device, or (ii) a logical data storage area of the non-volatile storage device that is assigned to the second source device; and in response to receiving the user input that requests the transfer, transmitting a copy of the selected one or more files to (i) the second source device, or (ii) the logical data storage area assigned to the second source device.

9. The apparatus of claim 8, wherein causing the device driver to be (i) transmitted from the apparatus to the source device and (ii) installed on the source device comprises:

transmitting, to the source device, a request for identifying information;
retrieving the identifying information from the source device;
selecting, based on the received identifying information, a device driver from among a plurality of different device drivers that correspond to different types of devices or different operating systems; and
causing the selected device driver to be (i) transmitted from the apparatus to the source device, and (ii) installed on the source device.

10. The apparatus of claim 9, wherein retrieving the identifying information from the source device comprises receiving an operating system identifier for an operating system of the source device; and
selecting the device driver comprises selecting, based on the operating system identifier, a device driver designated for an operating system indicated by the operating system identifier, the device driver being selected from among multiple device drivers that are stored by the apparatus and that are each designated for use with a different operating system.

11. The apparatus of claim 9, wherein retrieving the identifying information from the source device comprises receiving a vendor identifier for the source device and a product identifier for the source device; and
selecting the device driver comprises selecting, based on the vendor identifier and the product identifier, a device driver designated for a type of device that is indicated by the combination of the vendor identifier and the product identifier.

12. The apparatus of claim 9, wherein retrieving the identifying information from the source device comprises receiving a device identifier for the host; and
selecting the device driver comprises selecting, based on the device identifier, a device driver designated for a type of device indicated by device identifier.

13. The apparatus of claim 1, wherein the non-volatile data storage device is a hard disk drive or a solid state drive.

14. The apparatus of claim 1, wherein establishing communication with the source device comprises establishing communication with the source device over a Universal Serial Bus connection.

15. The apparatus of claim 1, wherein the one or more processors comprise:
a first processor configured to manage communications with the source device; and
a second processor configured to process user input received through the touchscreen.

16. A method performed by one or more processing devices, the method comprising:
establishing communication between a source device and a backup device that comprises a touchscreen and a non-volatile storage device;
determining that the source device does not have a device driver for the backup device;
in response to determining that the source device does not have a device driver for the backup device, causing the device driver to be (i) transmitted from the backup device to the source device and (ii) installed on the source device, the device driver being configured to generate an identifier for the source device and store the identifier at the source device;
receiving the identifier for the source device;
assigning, based on the received identifier for the source device, a particular logical data storage area of the non-volatile data storage device for storing data from the source device, the particular logical data storage area being assigned to the source device such that the backup device disallows other source devices from accessing data from the particular logical data storage area;
displaying, on the touchscreen, a user interface comprising user-selectable controls that permit a user to indicate data to be archived using the backup device;
receiving, through the user interface displayed on the touchscreen, user input that indicates data on the source device to be archived to the non-volatile data storage device;
in response to receiving the user input through the user interface displayed on the touchscreen, retrieving, from the source device, the data indicated by the user input; and
storing the retrieved data at the non-volatile data storage device in the particular logical data storage area assigned to the source device.

17. The method of claim 16, further comprising:
after the source device has been disconnected from the backup device, re-establishing communication between the backup device and the source device;
receiving the identifier for the source device;
determining, based on the identifier, that the particular logical data storage area is assigned to the source device;
receiving, through the touchscreen, user input requesting to restore, to the source device, data that corresponds to the source device and that is stored by the non-volatile data storage device; and
transferring data from the particular logical data storage area to the source device.

18. The method of claim 16, further comprising:
establishing communication between the backup device and a second source device that is different from the first source device;
receiving an identifier for the second source device;
identifying, based on the identifier, a second logical data storage area of the non-volatile data storage device that is assigned to the second source device, the second logical data storage device being different from and separate from the particular logical data storage area;
receiving, through the touchscreen, user input indicating data of the second source device to be archived using the backup device; and
storing the data indicated by the user input in the second logical data storage area of the non-volatile data storage device.

19. A non-transitory machine-readable medium storing executable instructions that, when executed by one or more processors, cause the one or more processors to perform operations comprising:
establishing communication between a source device and a backup device that comprises a touchscreen and a non-volatile storage device;
determining that the source device does not have a device driver for the backup device;
in response to determining that the source device does not have a device driver for the backup device, causing the device driver to be (i) transmitted from the backup device to the source device and (ii) installed on the source device, the device driver being configured to generate an identifier for the source device and store the identifier at the source device;
receiving the identifier for the source device;
assigning, based on the received identifier for the source device, a particular logical data storage area of the non-volatile data storage device for storing data from the source device, the particular logical data storage area being assigned to the source device such that the backup device disallows other source devices from accessing data from the particular logical data storage area;

displaying, on the touchscreen, a user interface comprising user-selectable controls that permit a user to indicate data to be archived using the backup device;

receiving, through the user interface displayed on the touchscreen, user input that indicates data on the source device to be archived to the non-volatile data storage device;

in response to receiving the user input through the user interface displayed on the touchscreen, retrieving, from the source device, the data indicated by the user input; and storing the retrieved data at the non-volatile data storage device in the particular logical data storage area assigned to the source device.

20. The non-transitory machine-readable medium of claim 19, wherein the operations comprise:

after the source device has been disconnected from the backup device, re-establishing communication between the backup device and the source device;

receiving the identifier for the source device;

determining, based on the identifier, that the particular logical data storage area is assigned to the source device;

receiving, through the touchscreen, user input requesting to restore, to the source device, data that corresponds to the source device and that is stored by the non-volatile data storage device; and transferring data from the particular logical data storage area to the source device.

\* \* \* \* \*